June 10, 1930.   W. H. REISNER   1,763,182
ORGAN VALVE
Filed Aug. 9, 1929   2 Sheets-Sheet 1
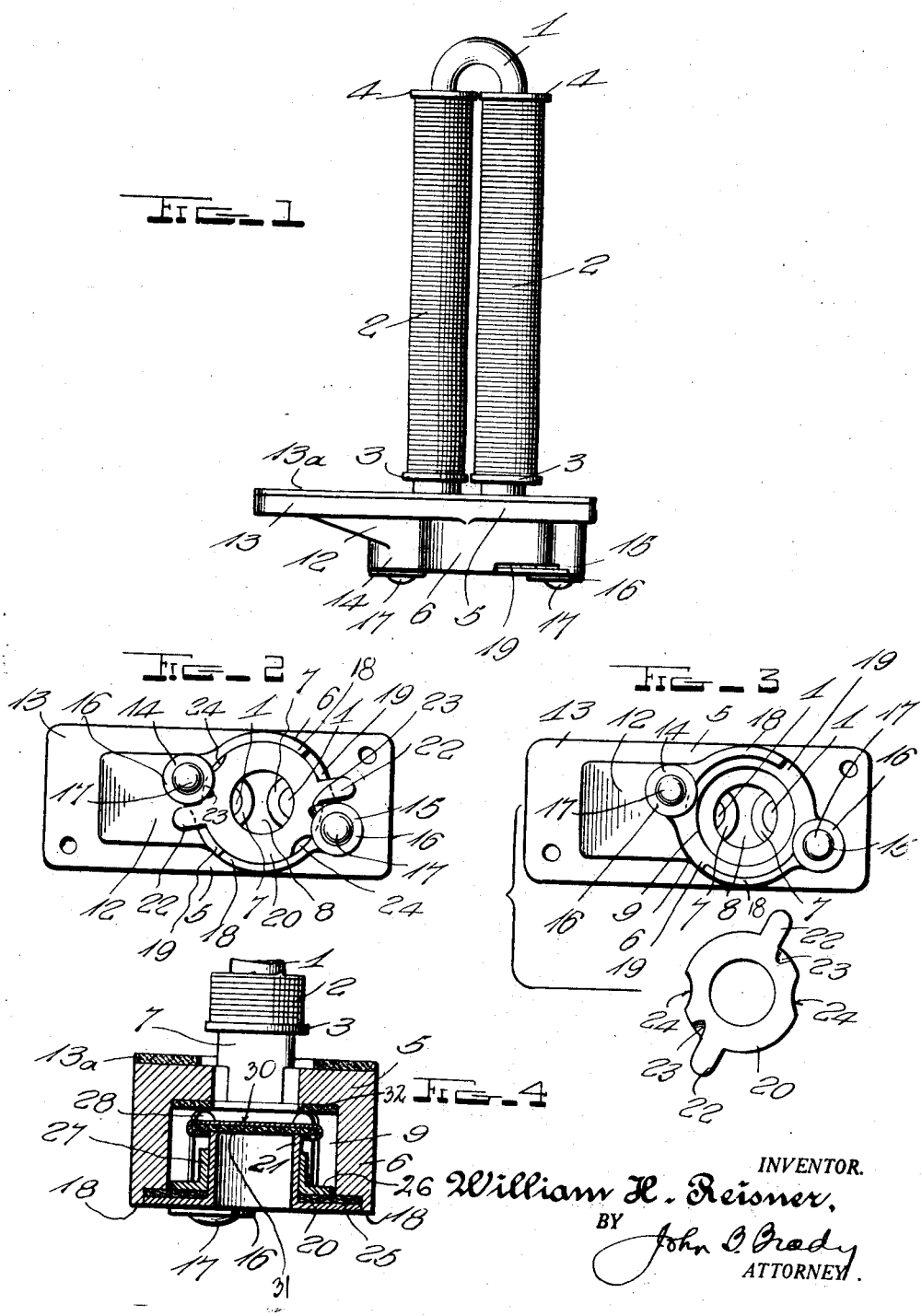

June 10, 1930. W. H. REISNER 1,763,182
ORGAN VALVE
Filed Aug. 9, 1929   2 Sheets-Sheet 2
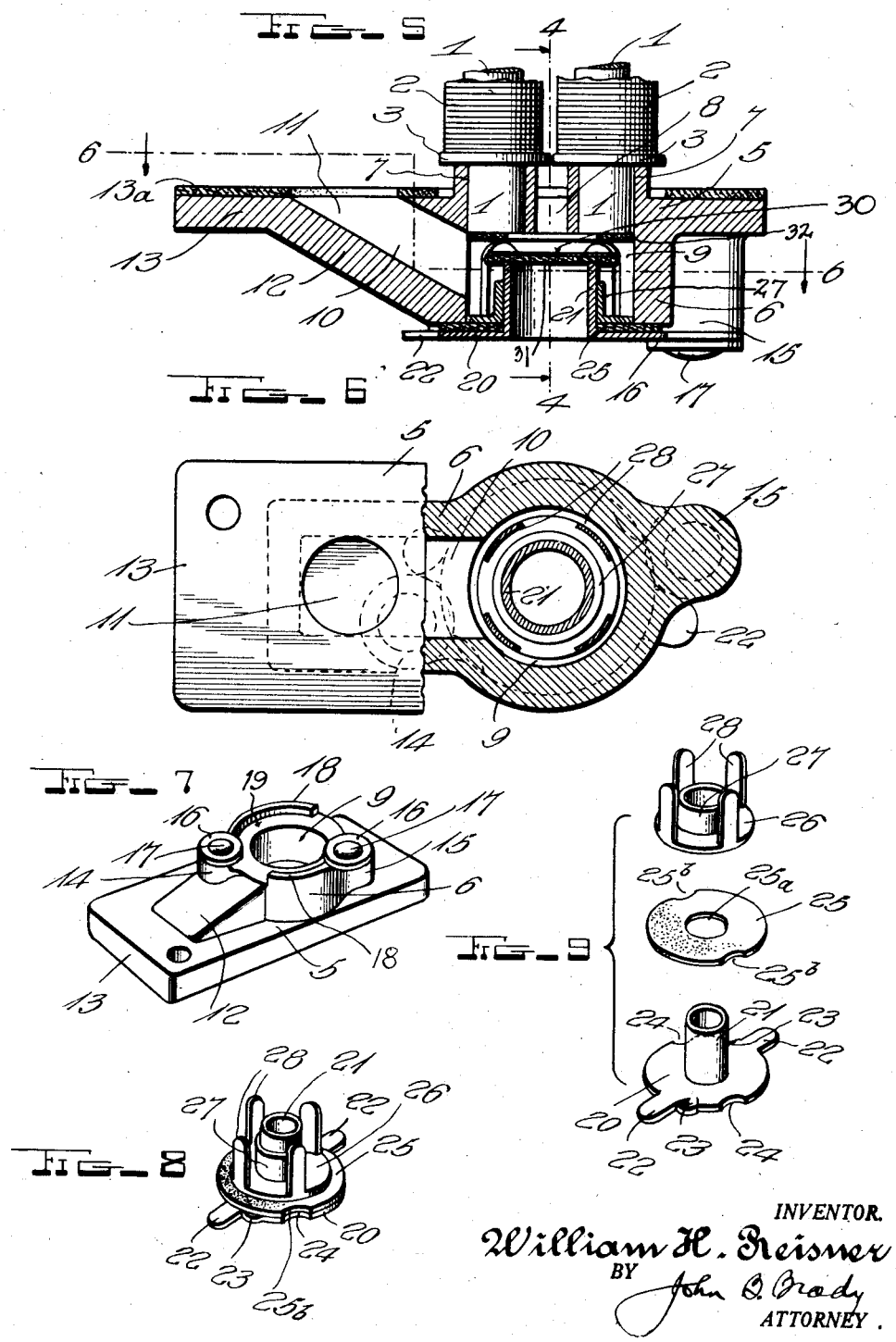

Patented June 10, 1930

1,763,182

UNITED STATES PATENT OFFICE

WILLIAM H. REISNER, OF HAGERSTOWN, MARYLAND, ASSIGNOR TO THE W. H. REISNER MANUFACTURING COMPANY, OF HAGERSTOWN, MARYLAND, A CORPORATION OF MARYLAND

ORGAN VALVE

Application filed August 9, 1929. Serial No. 384,546.

My invention relates broadly to valves and more particularly to an air valve for organs.

One of the objects of my invention is to provide a simplified construction of organ valve which may be manufactured inexpensively on a quantity production basis and readily assembled within an electromagnetic control structure for actuation with substantially no inertia for controlling the passage of air in an organ.

Another object of my invention is to provide a construction of organ valve which may be readily assembled within a valve housing for the control of the passage of air in an organ system, the valve having means for the removal and reinsertion thereof in the valve housing in the event that it becomes necessary to make repairs or adjustment.

A further object of my invention is to provide a construction of guide for a magnetic valve in an organ wherein the guide and valve mechanism are readily insertable in or removable from a valve housing for the control of the valve by an electromagnetic system.

A still further object of my invention is to provide a construction of unit for an organ valve in which a magnetic valve is controllable as to position within a valve housing by aid of a unit which is readily removable from or insertable into the valve housing.

Other and further objects of my invention reside in the simplified construction of valve set forth in the specification hereinafter following by reference to the accompanying drawings, in which:

Figure 1 illustrates a valve constructed in accordance with my invention and with the parts thereof assembled in operating position; Fig. 2 is a plan view of the organ valve looking toward the poles of the solenoid and with the disc valve removed from the valve housing; Fig. 3 is a plan view similar to Fig. 2 illustrating the valve unit removed from the housing and preparatory to the assembly of the valve unit within the housing, the disc valve being removed to show the pole pieces of the electromagnet; Fig. 4 is a lateral cross-sectional view taken through the valve unit and showing the disc valve in position with respect to the electromagnets which have been shown in fragmentary view partially in side elevation; Fig. 5 is a longitudinal cross-sectional view through the valve housing and valve unit in the organ valve of my invention; Fig. 6 is a plan view partially shown in lateral cross-section on line 6—6 of Fig. 5; Fig. 7 is a perspective view showing the housing and mounting for the valve unit; Fig. 8 is a perspective view of the valve unit; and Fig. 9 illustrates the several parts which form the guide in the valve unit of my invention.

The organ valve of my invention has been found to be extremely practical in its construction and simple in its manufacture and production.

A complete valve unit including a valve guide is provided which may be mounted in any desired manner beneath or adjacent an electromagnetic control device for permitting a magnetic valve to be moved through a short gap for controlling the passage of air through an organ system. The valve unit of my invention consists of a removable member carrying a gasket, a valve guide, and a valve seat which registers with the pole pieces of an electromagnetic control device, thereby allowing movement of the valve to open or close an air passage. The valve unit is provided with finger pieces extending laterally thereof by which the device may be manually gripped and inserted in position. A central valve seat is formed in the valve unit against which a magnetic disc valve may seat. Guide members extend integrally from a collar which concentrically surrounds the valve seat and serve to embrace the sides of the disc valve for insuring alignment of the valve with respect to the operating magnets. Provision is made for locking the valve unit in the valve housing in a manner whereby quick removal under manual control is possible at all times.

Referring to the drawings in more detail, reference character 1 represents the core of a horseshoe magnet having electromagnetic windings 2 wound thereon between insulated flanges 3 and 4. The opposite poles of the horseshoe magnet 1 project into sleeve-like projections 7 formed in the valve housing 5.

The valve housing 5 consists of a downwardly projecting portion 6 having a hollow interior cylindrical chamber 9 which is ported through one side of the valve housing as indicated at 8 between the sleeve-like portions 7 which receive the poles of the magnetic core 1. The interior of chamber 9 is connected by a passage 10 formed in the wall 12 of valve housing 5 to the port 11 formed in the upper portion of the valve housing designated at 13. The portion 13 of the valve housing 5 is in the nature of a horizontally extending flange having a gasket 13$^a$ carried thereon for providing an air tight connection with the co-operating parts of the organ system in which the valve is employed. The valve housing is provided with a pair of cylindrical lug portions 14 and 15 into which pins 17 extend. The pins 17 are provided with flanges or washer members 16 thereon which serve as ledges under which the valve unit may be gripped. The valve chamber terminates in a seat 19 having annular wall portions extending therefrom and designated at 18. These wall portions terminate at substantially diametrically opposite positions and serve as guides for the peripheral edge of the plate member 20 of the valve unit. The plate member 20 has its peripheral edge cut to size to fit between the annular walls 18 with notches 24 cut in diametrically opposite edges to enable the plate 20 to be passed over the protruding flanges 16. As the plate 20 is passed over the protruding flanges 16 and becomes seated on the seat 19, a partial rotary movement in a clockwise direction may be imparted to the plate 20 by manually grasping lugs 22 between the fingers and twisting the plate into a position where the peripheral edge of the plate slides beneath the extending flanges 16. In order to insure a locking of the valve unit in position, I provide plate 20 with outstruck projections 23 which tend to bind beneath flanges 16 thereby securing plate 20 in position. The plate 20 carries a gasket 25 with apertures at 25$^a$ for the passage of the cylindrical valve seat which is formed integral with plate 20 as shown at 21. The gasket 25 is provided with diametrically cut away notches 25$^b$ which are aligned with notches 24 in plate 20 and conforms to the general contour of plate 20 and is secured in position thereon by means of the member 27 which is telescopically positioned over the cylindrical portion 21. The member 27 is cylindrical in form and is integrally connected to the plate 26 which is provided with a multiplicity of upstanding integral tongues 28. The tongues 28 serve to guide the peripheral edges of magnetic disc valve 30 and prevent lateral displacement of the disc valve out of alignment with the pole pieces 1 of the horseshoe magnet. The magnetic disc valve 30 consists of magnetic material having an annular edge formed thereon which is rolled over a fibrous disc 31, the fibrous disc serving as a seal with respect to the annular valve seat 21 when the disc is released from the influence of the magnetic system 1—2. By means of annular gasket 32 positioned in the interior of chamber 9, the magnetic disc valve 30 is prevented from directly contacting with the faces of pole pieces 1—1, and in this way sticking of the magnetic valve within the valve chamber is avoided.

The assembly of the parts of the valve unit has been shown more fully in Fig. 9 wherein the simplified construction of the valve unit will be apparent. The vertical height of tongues 28 is such that the extremities of the tongues contact with gasket 32 when the valve is assembled and thereby serve as a continuous guide for the magnetic disc throughout the short travel of the valve under influence of the magnetic system 1—2. The disc valve 30 is held against the annular seat 21 under the action of air pressure and is released by magnetic attraction of magnetic system 1—2, permitting the passage of air through port 11, passage 10, between upstanding guides 28, between the gap existing between the valve disc and the upper annular extremity of cylindrical extension 21, and thence through the extension of cylindrical extension 21 to atmosphere.

It is not essential that the valve unit be employed in connection with the housing which I have illustrated as many modifications may be made in the construction of the valve housing, and I desire it to be understood that the valve unit may be assembled in association with various forms of valve housings.

While the construction of organ valve illustrated herein has been found to be highly practical and successful in its operation, it will be apparent to those skilled in the art that modifications in the valve structure may be made, and I desire it to be understood that no limitations upon my invention herein are intended except as may be imposed by the scope of the appended claims.

What I claim as new and desire to secure by Letters Patent of the United States is as follows:

1. In an organ valve comprising a valve housing, an electromagnetic system having pole pieces extending into said valve housing, a valve chamber in said valve housing, a valve unit insertable into or removable from said valve chamber, said valve unit comprising a plate member having a valve seat formed thereon, a multiplicity of guiding tongues secured thereto, a magnetic disc valve positioned for movement between said guiding tongues with respect to said valve seat, and means for securing said plate member with respect to said valve housing by rotative movement of said plate with respect to said valve housing.

2. In an organ valve, a magnetic control device, a valve unit positioned adjacent said magnetic control device, said valve unit including a mounting plate, a valve seat formed integral therewith, valve guiding means telescopically positioned over said valve seat, and a magnetic disc valve controlled by said valve guiding means and positioned adjacent said magnetic control device.

3. In an organ valve, an electromagnetic control device, a valve unit positioned adjacent said electromagnetic control device, said valve unit including a supporting plate, a cylindrical valve seat integrally connected thereto, a cylindrical member concentrically positioned about said cylindrical valve seat and having tongues extending therefrom in directions parallel to the central axis of said cylindrical valve seat, and a magnetic disc valve positioned upon said valve seat and confined in its lateral movement by said tongues under control of said electromagnetic control device.

4. In an organ valve, a valve housing, an electromagnetic control device projecting into said valve housing, a valve chamber in said valve housing, said valve chamber being open in a position opposite the entrance of said electromagnetic control device to said chamber, a plate member arranged to close the opening in said valve housing, said plate member carrying an inwardly directed cylindrical sleeve forming a valve seat, a magnetic disc valve arranged to be mounted on the extremity of said valve seat, and a guide device telescopically secured over said valve seat, said device having tongues formed integral therewith and embracing opposite peripheral edges of said magnetic disc valve for guiding said disc valve in a predetermined path during the operation thereof under control of said electromagnetic control device.

5. In an organ valve, a valve housing, an electromagnetic control device projecting into said valve housing, a valve chamber in said valve housing, said chamber terminating in an annular wall having ledges formed thereon terminating at diametrically opposite positions on said wall, flange members located at diametrically opposite positions on said wall and extending over said ledges, a plate member having its peripheral edge notched to pass over said flange members and to seat upon said wall between said ledges, lugs extending from said plate member for imparting a twisting movement thereto for locking the peripheral edges of said plate beneath said flanges, and valve mechanism carried by said plate for actuation by said electromagnetic control device.

6. In an organ valve, a valve housing, an electromagnetic control device projecting into said valve housing, a valve chamber in said valve housing, said chamber terminating in an annular wall having ledges formed thereon terminating at diametrically opposite positions on said wall, flange members located at diametrically opposite positions on said wall and extending over said ledges, a plate member having its peripheral edge notched to pass over said flange members and to seat upon said wall between said ledges, lugs extending from said plate member for imparting a twisting movement thereto for locking the peripheral edges of said plate beneath said flanges, a cylindrical valve seat carried by said plate member, a valve guide telescopically secured over said cylindrical valve seat, said valve guide including a multiplicity of lugs extending substantially parallel to the axis of said valve seat, and a magnetic disc valve positioned between said lugs and confined in its movement by said lugs when actuated by said electromagnetic control device.

7. In an organ valve, a valve housing, an electromagnetic control device extending into said valve housing, a valve chamber in said valve housing, said chamber terminating in a wall having inwardly directed diametrically opposed flanges connected thereto, a plate member notched to correspond to the contour of said flanges, valve guide mechanism carried by said plate member, a magnetic disc valve positioned in said valve guide mechanism, and means on said plate member for locking said plate member beneath the flanges on said wall for positioning said valve guide mechanism within said chamber for actuation of said magnetic disc valve under control of said electromagnetic control device.

In testimony whereof I affix my signature.

WILLIAM H. REISNER.